US006801576B1

(12) United States Patent
Haldeman et al.

(10) Patent No.: US 6,801,576 B1
(45) Date of Patent: Oct. 5, 2004

(54) SYSTEM FOR ACCESSING, DISTRIBUTING AND MAINTAINING VIDEO CONTENT OVER PUBLIC AND PRIVATE INTERNET PROTOCOL NETWORKS

(75) Inventors: Randy M. Haldeman, Menlo Park, CA (US); Steve Lerner, Daly City, CA (US); Gregory Neil Smith, Cupertino, CA (US)

(73) Assignee: Loudeye Corp., Seattle, WA (US)

( * ) Notice: Subject to any disclaimer, the term of this patent is extended or adjusted under 35 U.S.C. 154(b) by 587 days.

(21) Appl. No.: 09/588,827

(22) Filed: Jun. 7, 2000

Related U.S. Application Data (60) Provisional application No. 60/147,653, filed on Aug. 6, 1999.

(51) Int. Cl.[7] .............................................. H04N 7/12
(52) U.S. Cl. ................................................ 375/240.29
(58) Field of Search ...................... 375/240.29, 240.26; 382/162, 163–167, 232; 348/384.1; H04N 7/12

(56) References Cited

U.S. PATENT DOCUMENTS

| | | | | |
|---|---|---|---|---|
| 5,339,368 A | * | 8/1994 | Higgins-Luthman et al. | 382/169 |
| 5,808,697 A | * | 9/1998 | Fujimura et al. | 348/672 |
| 5,815,146 A | | 9/1998 | Youden et al. | |
| 5,877,812 A | * | 3/1999 | Krause et al. | 375/240.25 |
| 5,956,716 A | | 9/1999 | Kenner et al. | |
| 5,982,926 A | * | 11/1999 | Kuo et al. | 382/167 |
| 6,026,183 A | * | 2/2000 | Talluri et al. | 382/194 |
| 6,125,201 A | * | 9/2000 | Zador | 382/166 |
| 6,272,253 B1 | * | 8/2001 | Bannon et al. | 382/236 |
| 6,577,759 B1 | * | 6/2003 | Caron et al. | 382/164 |

FOREIGN PATENT DOCUMENTS

| | | |
|---|---|---|
| WO | WO9818076 | 4/1998 |

OTHER PUBLICATIONS

Blaesner, Wilfried, "Audioprozessor vereinfacht NF–Signalaufbereitung im Mobilfunk", *Endgerate–Chips,* 688 NTZ Nachrichten Technische Zeitschrift 43, Juni, No. 6, Berlin, DE (1990).

(List continued on next page.)

*Primary Examiner*—Nhon Diep
(74) *Attorney, Agent, or Firm*—Shaw Pittman LLP

(57) ABSTRACT

A system for handling video content in a network, such as the Internet. Aspects of the system provide for accessing, distributing and maintaining digital video or other image content. Video content is acquired from content providers. Searching, and identification of desired video content is provided to users of the system by annotating video content with searchable text. The searchable text is accessed via a database where relational queries are used to identify desired content. Portions, or chapters, of the video can be linked to unique descriptions. This allows for indexing of video so that a viewer, or user, does not have to watch unwanted segments to get desired information. Access of the video by end users is facilitated by maintenance of multiple video servers that provide access to the content. Distribution of video broadcasts can be on-demand or in real-time. A preferred embodiment uses both satellite and on-location video distribution. Video information is pre-processed to compensate for artifacts, degradation and other undesirable effects that can be introduced into the video information due to compression. The speed of transmission to an end user from each of multiple servers is tested prior to transmission of the bulk video so that the fastest or most efficient server can be used for the transmission. A user interface is provided to allow end users to access video information. Utilities are provided to monitor and log end user accessing of videos. Such logged information can be used to promote additional products or services or to steer a user to information that the user may need or want. For example, other information related to the information in a chosen video can be provided to a particular user. Other features are described

5 Claims, 4 Drawing Sheets

OTHER PUBLICATIONS

Noll, Peter, "Digital Audio Coding for Visual Communications", *Proceedings of the IEEE,* vol. 83. No. 6, Jun., New York, US (1995).

Drake, Laura A., et al, "Wavelet Analysis in Recruitment of Loudness Compensation", *Transactions on Signal Processing,* Dec., No. 12, New York, US (1993).

Nandkumar. S., et al, "Speech Enhancement Based on a New Set of Auditory Constrained Parameters", *Digital Speech Processing Laboratory Department of Electrical Engineering,* Duke University, Durham, North Carolina, Apr. 19 (1994).

Bestavros, Azer, "Demand–based Document Dissemination to Reduce Traffic and Balance Load in Distributed Information Systems", *Computer Science Department,* Boston University, Massachusetts, (1995).

Carducci, F., et al, "Isis Project: An Open Platform for Multimedia Interactive Services", *The Institution of Electrical Engineers,* IEE, Savoy Place, London WC2R 0BL, UK, (1997).

Swain, Cassandra T., et al, "Color Balance for Video Conferencing", *AT&T Labs—Research,* Red Bank, New Jersey, IEEE (1997).

Tsoukalas, Dionysis E., et al, "Perceptual Filters for Audio Signal Enhancement", *J. Audio Engineering Society,* vol. 45, No. 1 and 2, Wire Communications Laboratory, EE Department, University of Patras, Greece, Jan./Feb. (1997).

Kamiya, Hajime, et al, "An Improved Content Search Engine", *Usage of Network Configuration Information,* GSIS Tohoku University, Cyber Solutions, Inc., Sep. (1998).

Deller, J. R., et al, "Discrete–Time Processing of Speech Signals", section 5.3.6 *Preemphasis of the Speech Waveform,* MacMillian Publishing Co., New York, (1993).

Guillemot, C., et al, "Integrating MPEG–4 Into the Internet", *Proceedings of the European Conference on Multimedia Applications, Services and Techniques,* Madrid, Spain, May 26–28 (1999).

* cited by examiner

SYSTEM FOR ACCESSING, DISTRIBUTING AND MAINTAINING VIDEO CONTENT OVER PUBLIC AND PRIVATE INTERNET PROTOCOL NETWORKS

CLAIM OF PRIORITY

This application claims priority from U.S. Provisional Patent Application No. 60/147,653 filed Aug. 6, 1999 entitled SYSTEM FOR ACCESSING, DISTRIBUTING AND MAINTAINING VIDEO CONTENT OVER A COMPUTER NETWORK which is hereby incorporated by reference, as is set forth in full in this document, for all purposes.

BACKGROUND OF THE INVENTION

This invention relates in general to information transferred over computer networks and more specifically to a system for processing and distributing video information over various types of Internet protocol networks.

An important feature of the global Internet is the ability to make a large amount of information available to many users. Not only should the information be immediately available, but it is desirable to provide for a fast and intuitive interface for finding the information or content desired.

High-bandwidth content, such as digital video, has proven to be difficult to handle on the Internet. Because of the large size of video files, and the high connection speeds needed to view the files, it is especially important, yet difficult, to provide users with efficient ways to search and access video content. Efficient searching is necessary so that a user does not have to wade through many minutes of video information to determine that sought-after information is, indeed, within the video program.

One of the ways that the prior art has used to reduce video bandwidth is to compress the video data before storing and distributing it on a network. Various compression schemes and data formats can be used. For example, MPEG, Windows Media, RealVideo, etc. can be used. Significant degradation or artifacts can be introduced into the video data as a result of a poorly implemented encoding process. These artifacts result in a lower-quality video/audio experience for the end-user.

Thus, it is desirable to provide a video access, management and distribution system that provides users quick access to the video content they desire, provides a system for preparing video, or other media, for storage, access and distribution over a computer network, and provides the highest quality video content available over computer networks.

SUMMARY OF THE INVENTION

The present invention provides a system for preparing, distributing and accessing video content in an Internet protocol network. Aspects of the system provide for accessing, distributing and maintaining digital video or other multimedia content. Video content is acquired from content providers and prepared for Internet (or other computer network) access.

Searchability of desired video content is provided to users of the system by linking video content to searchable text. The searchable text is accessed via a database where relational queries are used to identify desired content. Portions, or chapters, of the video are linked to a unique text description. This allows for indexing of video so that a viewer, or user, can search for specific information and receive access to video clips that contain the information searched for, while avoiding clips that don't have any value to the user.

Access of the video by end users is facilitated by maintenance of multiple video servers that provide access to the content. Distribution of video broadcasts can be in real-time or on demand. A preferred embodiment uses both satellite and locally stored digital video distribution. Video information is pre-processed to minimize artifacts, degradation and other undesirable effects that can be introduced into the video information due to compression. The speed of transmission to an end user from each of multiple servers is tested prior to transmission of the video stream so that the server closest to the user on the Internet can be used for the transmission, reducing the chance of degradation due to network traffic conditions.

One embodiment of the invention provides a method for encoding a video signal, the method comprising increasing the saturation level of the video signal to just below visual distortion of the video, selecting a high contrast and brightness levels, converting the video signal to digital data, and compressing the digital data.

Another embodiment includes a method of encoding an audio signal, the method comprising increasing the volume of a predetermined frequency range of the audio signal, reducing the variability in the dynamic range of the audio signal; converting the audio signal to a digital data; and compressing the digital data.

An aspect of the invention provides an encoding system that uses standard components to achieve a low-cost, efficient, and easily serviceable chapterizing and encoding process for handling a large amount of video processing in a uniform and parallel manner.

Yet another embodiment provides a method for distributing video over the Internet, the method comprising obtaining the Internet Protocol (IP) address of a computer used by a user to log onto a predetermined website; using the obtained IP address to determine the physical location of the user's computer; performing a route analysis to detect server computers between a starting server computer and the user's computer; using the route analysis and IP address information to identify a server computer in proximity to the user's computer; and transferring video information from the server computer to the user's computer.

DETAILED DESCRIPTION OF A PREFERRED EMBODIMENT

A preferred embodiment of this invention is to be fielded by Technology Education Network, Inc., or "TENTV". This patent discusses system aspects of the invention.

Note that, although the term "video" is used to refer to the specific content that is stored, processed, or otherwise manipulated by the subject invention, this term merely refers to the type of media handled by a preferred embodiment of the invention. The term "video" for purposes of determining the scope of the invention is defined as including all types of media, or content, that can be stored, distributed, accessed or processed in a network and/or computer system. For example, other media types within the scope of the invention include audio, images and data.

System Overview

Figure 1:
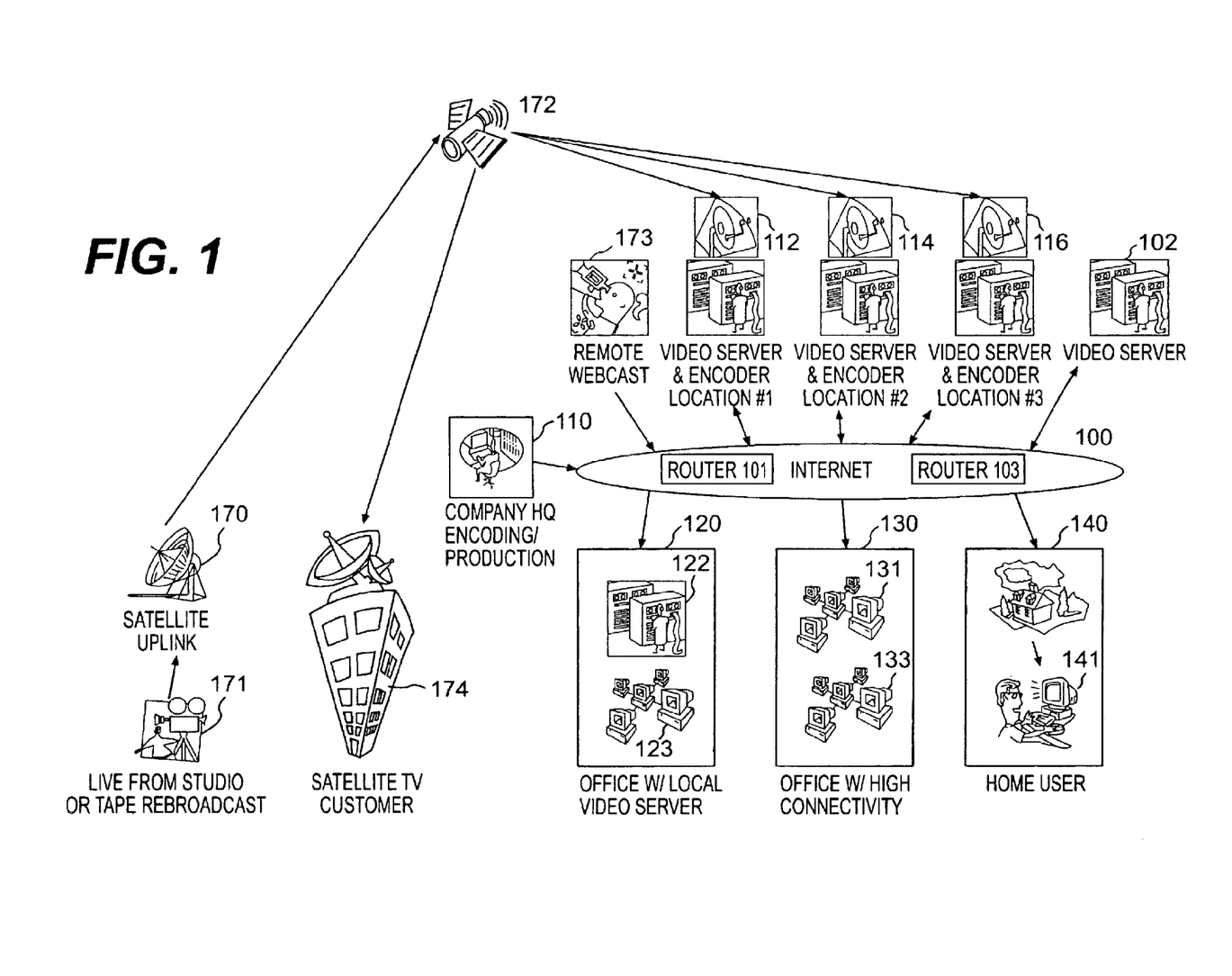
FIG. 1 shows a generalization of the system of the present invention.

FIG. 1 shows a generalization of the system of the present invention.

In FIG. 1, network 100 represents a large network, such as the Internet, which includes many processing devices that perform data storage, transfer and access functions. In the Internet, for example, such devices are called "server" computers. Servers are indicated by rectangles such as server 102. Servers may perform their roles in isolation, such as server 102. Other servers can be part of a localized network such as a network on a college or business campus, or a LAN. Collections of servers that operate under the control or domain of a localized management entity, such as a corporate or campus network, are grouped as shown at 130. In general, the Internet allows for wide-ranging, diverse and changing collections of servers under control of different organizations as long as the servers adhere to certain well-defined standards such as the domain name service (DNS), Internet Protocol, etc.

In a preferred embodiment of the invention, a primary company acts as a service provider for video access, encoding, distribution and management. The goal of the primary company is to obtain video content and make the video content available to users, or viewers, in an efficient and economical manner. In FIG. 1, entities 120, 130 and 140 are customers of a primary company which operates video origination and encoding services represented by 171, 110 and 173. Video is distributed to customers by satellite link 172 directly to customers, as shown at 174, via satellite link to co-located encoders and servers as represented by 112, 114 and 116; or directly to the Internet after encoding by the primary company as shown at 110. Remote webcast 173 represents direct transmission of a live recording to the Internet as where the video is encoded in real-time and immediately placed onto the Internet. Still other forms of distribution are possible. Cable networks, fiber optic, wireless or other communication channels can carry the data as opposed to a satellite link. All forms of network transfer are considered within the scope of the invention.

Given the nature of the Internet, the video information can reside on any server and be accessed by any user such as user 141. However, the quality of the video playback, and the speed with which the user receives responses to queries depends on a number of factors. For example, the speed of the network between a sending server, e.g., sending server 112, and user 141 is a factor. The speed between company 130's Internet connection point and the rest of company 130's users is another factor.

The speed of each communication link between intermediary servers and between the user and the Internet affects the transfer rate, time delays and overall quality of the video transmission. In general, geographic distance can be an approximate measure of the quality of service that a user can expect. The closer that the user is to the sending server the more likely that the transfer rate will be faster.

Companies such as 120 and 130 (or other entities) may wish to provide video content to their employees, customers, or others. However, since supporting video servers, databases and other aspects of video data management require complex installations of storage, servers, personnel and other resources (discussed below), such companies are likely to want the support of video content performed by a company such as primary company 110. Therefore, primary company 110 can obtain video content from a company, such as companies 120 or 130, and make such video content directly available to user 110 via primary company 110's server 112, 114, and 116. Alternatively, primary company 110 can make the video available through company 120's server 122. Thus, videos resident on server 112 can be transferred over the Internet to server 122 before being delivered to users in company 120.

Video can be sourced at more than one server. For example, the desired video may already be resident on server 114 so that there is no need to transfer video information from server 112 to server 114. Or, the video information can be on a server, such as server 116, that happens to be the closest—either geographically, or from a network transfer standpoint—to user 141. Satellite receiver antennas such as 112 and 114 can be used to download video or other data from satellites for fast transmission of information to servers on the Internet at locations 112 and 114.

Users who do not wish to view video on their computer desktop and opt for viewing on a standard television or a large scale projection event in a theater can view video in real time uplinked from 170 to satellite 172 and received at company 174. Company 110 offers the services of broadcasting live or taped video for viewing on standard televisions equipped with a satellite receiving antenna.

The following section describes standard hardware suitable for use with the present invention.

Description of Hardware

Figure 2A:
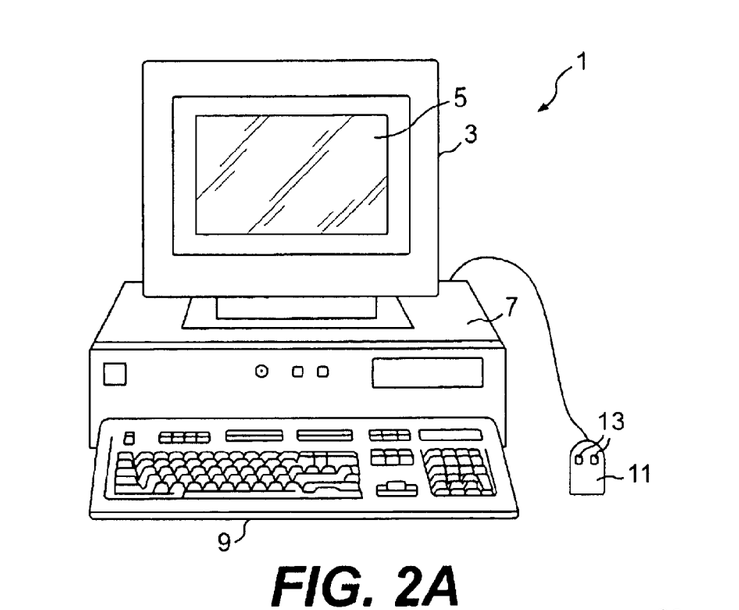
FIG. 2A is an illustration of the computer system suitable for use with the present invention.

FIG. 2A is an illustration of multimedia computer system 1 including display 3 having display screen 5. Cabinet 7 houses standard computer components (not shown) such as a disk drive, CDROM drive, display adapter, sound card, network card, random access memory (RAM), central processing unit (CPU), and other components, subsystems and devices. User input devices such as mouse 11 having buttons 13, and keyboard 9 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

Figure 2B:
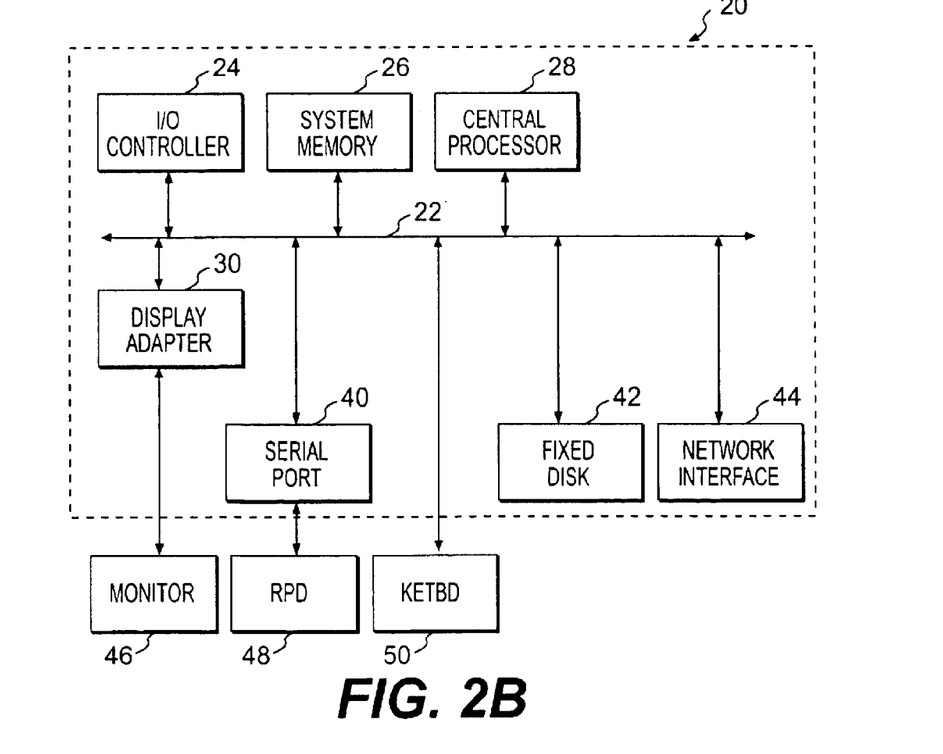
FIG. 2B illustrates subsystems of the computer system of FIG. 2A.

FIG. 2B illustrates subsystems that might typically be found in a computer such as computer 100.

In FIG. 2, subsystems within box 20 are directly interfaced to internal bus 22. Such subsystems typically are contained within the computer system such as within cabinet 7 of FIG. 2A. Subsystems include input/output (I/O) controller 24, System Random Access Memory (RAM) 26, Central Processing Unit (CPU) 28, Display Adapter 30, Serial Port 40, Fixed Disk 42 and Network Interface Adapter 44. The use of bus 22 allows each of the subsystems to transfer data among the subsystems and, most importantly, with the CPU. External devices can communicate with the CPU or other subsystems via bus 22 by interfacing with a subsystem on the bus. Monitor 46 connects to the bus through Display Adapter 30. A relative pointing device (RPD) 48 such as a mouse connects through Serial Port 40. Some devices such as Keyboard 50 can communicate with the CPU by direct means without using the main data bus as, for example, via an interrupt controller and associated registers (not shown).

As with the external physical configuration shown in FIG. 2A, many subsystem configurations are possible. FIG. 2B is illustrative of but one suitable configuration. Subsystems, components or devices other than those shown in FIG. 2B can be added. A suitable computer system can be achieved without using all of the subsystems shown in FIG. 2. For example, a standalone computer need not be coupled to a network so Network Interface 44 would not be required. Other subsystems such as a CDROM drive, graphics accelerator, sound card etc. can be included in the configuration without affecting the performance of the system of the present invention.

Figure 2C:
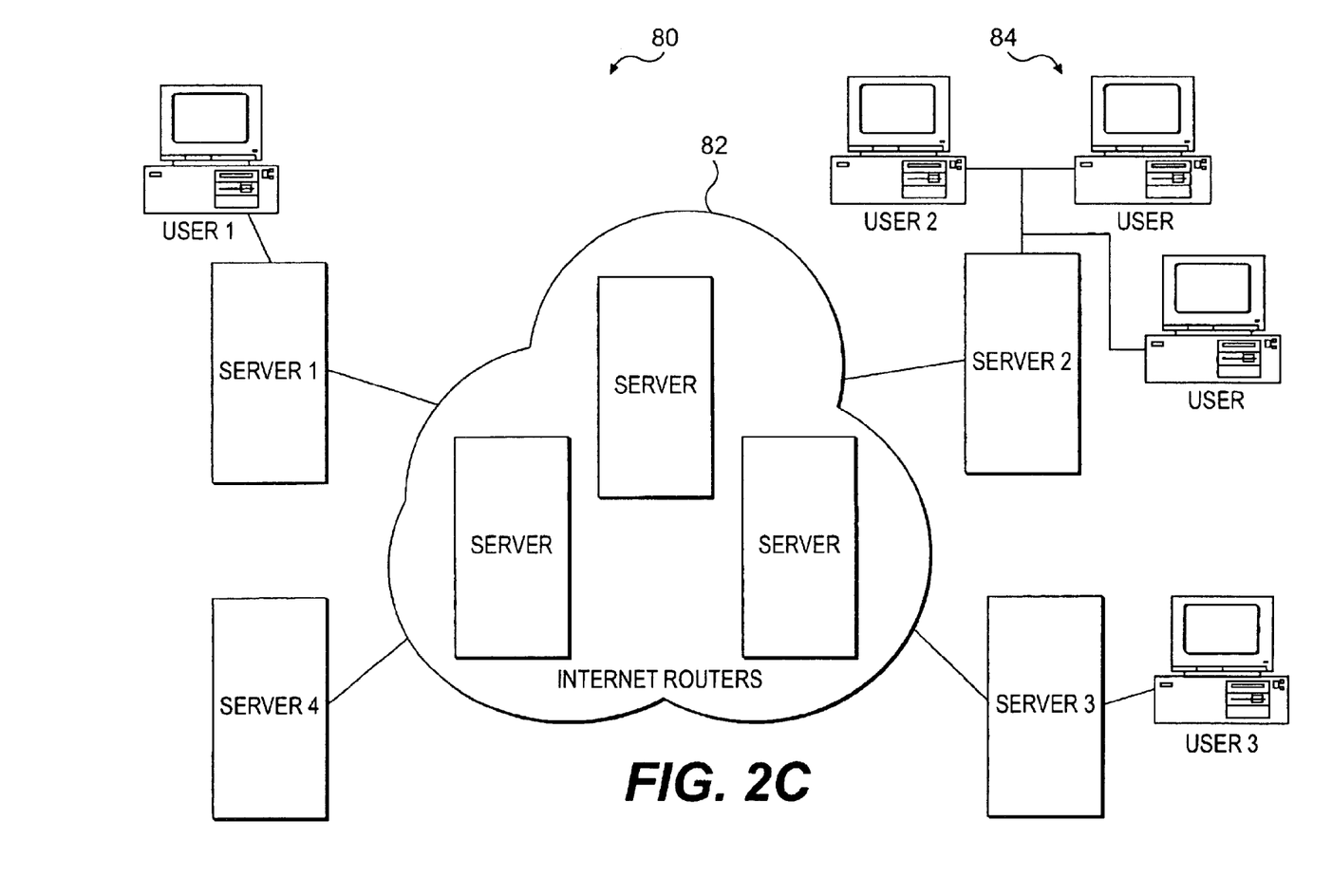
FIG. 2C is a generalized diagram of a typical network according an embodiment of the present invention.

FIG. 2C is a generalized diagram of a typical network 80.

In FIG. 2C, the network company 84 includes several local networks coupled to the Internet. Although specific network protocols, physical layers, topologies, and other network properties are presented herein, the present invention is suitable for use with any network.

In FIG. 2C, company 84 and its computer users are connected to servers. This connection can be by a network such as Ethernet, Asynchronous Transfer Mode, IEEE standard 1553 bus, modem connection, Universal Serial Bus, etc. The communication link need not be a wire but can be infrared, radio wave transmission, etc. The servers are coupled to the Internet 82. The Internet 82 is shown symbolically as a collection of server routers. Note that the use of the Internet for distribution or communication of information is not strictly necessary to practice the present invention but is merely used to illustrate a preferred embodiment, below. Further, the use of server computers and the designation of server and client machines is not crucial to an implementation of the present invention. Users from company 84 can be connected directly to the Internet. A server in company 84 is typically connected to the Internet by a relatively high bandwidth transmission medium such as a T1 or T3 line. Other computers in company 84 can be connected to the Internet through alternate routes inside of company 84.

Note that the concepts of "client" and "server," as used in this application and the industry, are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information) and can be acting as a server at another point in time (because it is providing information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically thought of as client machines because they are primarily used to obtain information from the Internet for a user operating the machine.

Depending on the specific software executing at any point in time on these machines, the machine may actually be performing the role of a client or server, as the need may be. For example, a user's desktop computer can provide information to another desktop computer. Or a server may directly communicate with another server computer. Sometimes this is characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention may be presented as a single entity, such software is readily able to be executed on multiple machines. That is, there may be multiple instances of a given software program, a single program may be executing on two or more processors in a distributed processing environment, parts of a single program may be executing on different physical machines, etc. Further, two different programs, such as a client and server program, can be executing in a single machine, or in different machines. A single program can be operating as a client for one information transaction and as a server for a different information transaction.

System Details

As mentioned, the invention provides features for a primary company to provide services relating to video access, distribution, maintenance and management. The primary company operates a webpage-based client, or subscriber, front-end with its servers to allow users to search and access video. It also maintains video distribution to subscribers over networks such as the Internet, intranets, local area networks (LANs) etc.; and provides additional infrastructure for more direct, high-bandwidth video distribution.

The primary company combines a series of processes designed (i) to improve the quality of video and audio signals broadcast (or accessed on demand) over the Public Internet; (ii) to archive, index and chapterize videos in a video database to allow users to search the video database for a specific portion of the video; (iii) to permit those broadcasting over the network to stream video only to viewers designated by the broadcasters; (iv) to provide broadcasters with reports reflecting key statistical data on viewership patterns; and (v) provide an integrated destination on the Public Internet from which such services are available. These aspects are described in more detail, below.

Maintenance of Multiple Video Servers

The primary company maintains remote video servers at multiple Internet server facilities (or "co-location" facilities), as well as client sites, throughout the world to ensure that video is served from the location that will provide the best signal to the end user and to provide an extra layer of "fault tolerance" in the event of a failure in any given co-location facility, any portion of the public Internet backbone or the like. Company co-location facilities are typically equipped with satellite downlink equipment, a video server (permitting streaming at multiple bit-rates), a disk storage array for video, a firewall (to prevent unauthorized access to the machine and video signals), audio preprocessing equipment and computers permitting audio/video compression and encoding at various bit-rates. Remote servers at co-location facilities are strategically placed near major peering points, avoiding major public peering points (such as MAE West and MAE East) at which packets carrying data are often "dropped" due to congestion. Packet loss decreases video quality. Accordingly, this strategic placement of remote servers, by reducing the likelihood of packet loss, preserves the quality of video and audio viewed by the end user.

Distribution of Real-Time Video Signals Over the Public Internet

The primary company employs two methods for distributing real time broadcasts over the Public Internet: Multipoint Satellite Video Distribution and On Location Distribution:

The primary company installs satellite downlink receivers at co-location facilities and other locations. Audio/Video signals are distributed to these servers by satellite. This method of distribution enhances the quality of real time video and audio signals received at the remote video servers by bypassing the Public Internet between video signal source and the video server. Using multiple video servers reduces the possibility of a broadcast failure to end users by eliminating reliance on one video server and any one portion of the Public Internet backbone. In addition, sending the signal to other remote video servers permits more viewers to watch the video broadcast by increasing the potential number of streams of video served. This method of distribution is primarily used to enhance real time broadcasts but may also be used to transfer video, audio and other files to remote servers on demand, or by any other delivery scheme.

The original video signal is transported by land-line or satellite "backhaul" to the satellite uplink facility where the signal is encoded into high-bitrate digital video and "uplinked" to a satellite that transmits to "downlink" equipment installed at remote server locations. The signal is received by the downlink equipment and decoded by an integrated receiver/decoder.

Once received and decoded by the downlink receiver, the video and audio signals are run through a series of steps designed to ameliorate the negative effects of encoding and compression algorithms which otherwise degrade the luminance and chrominance in the video, inject ancillary noise into the audio, and amplify non-useful portions of the audio frequency spectrum and its dynamic range. This procedure provides a means of optimizing the video and audio (especially the human voice) to provide the best quality after the compression/encoding process.

The video and audio signals are then run through computers that encode at various bit-rates. The encoded audio and video signals are then sent digitally to the video server (splitter) for distribution over the Public Internet as well as a local hard drive for archival (or "on-demand") use.

Prior to streaming video to an end-user, the Company sends test packets from all video servers to the end-user's desktop or the nearest network point reachable to the end-user's desktop and measures the return time. Video will then be served to the end-user from the remote server with the packet that had the fastest return time. This method permits an automatic and "split-second" determination of which remote server is within the closest electronic proximity to the end user's desktop, thereby enhancing the quality of the video received by the customer.

On location preprocessing provides a lower cost alternative to the satellite enhanced transmission method described above. Using this method, the real time audio and video feed is run through the pre-processing enhancement and encoding steps "on location" prior to being distributed over the Public Internet backbone to a remote video server. Once at the remote video server, the signal is sent to end users and other remote servers. Sending the signal to other remote servers permits more viewers to watch the broadcast by increasing the number of streams of video served. On location distribution still uses the Company's web video database interface and provides viewership information for statistics analysis. Video is served from servers in closest electronic proximity to the end-user using the Load Balanced Video Distribution System described above.

Video Encoding

Figure 3:
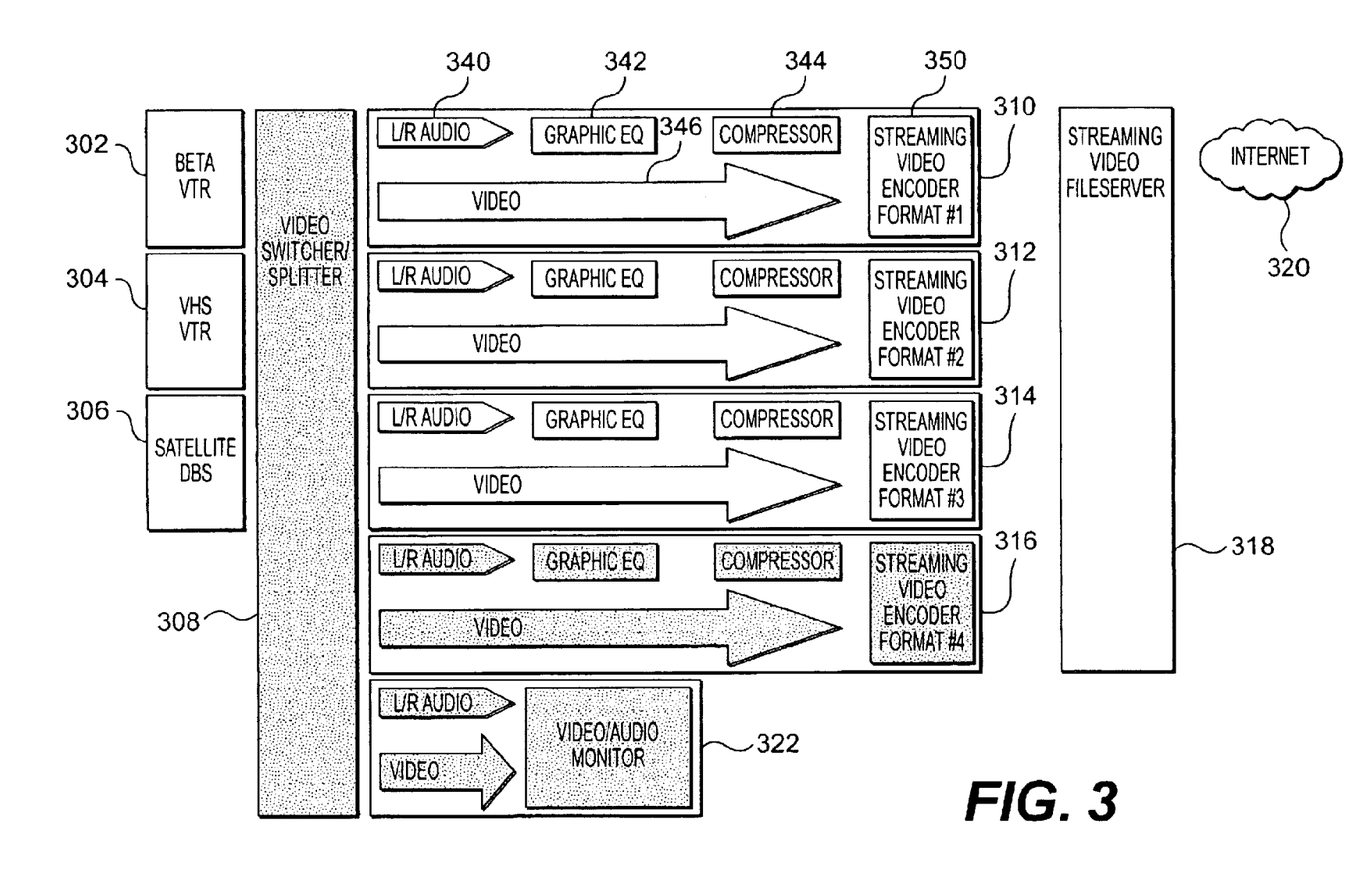
FIG. 3 shows a diagram illustrating video encoding in a preferred embodiment.

FIG. 3 shows a diagram illustrating how video encoding is accomplished in a preferred embodiment.

In FIG. 3, a video source such as video tape recorder (BTR) 302, consumer VHS format Video Tape Recorder VTR 304 or Digital Broadcast Satellite Receiver DBS 306 represent possible sources of video data to be encoded. Note that any suitable video source may be used. Although multiple sources are shown, the encoding operation discussed below involves only a single video source. Naturally, given redundant equipment, multiple video sources can be encoded at the same time.

Video switcher/splitter 308 is used to route a signal from a video source to multiple destinations at the same time. In a preferred embodiment, four video encoding processes are carried on at the same time. As illustrated by video encoding paths 310, 312, 314 and 316. Each encoding path operates in parallel and ultimately encodes the video in a different format. The resulting encoded video is stored on streaming video file server 318 for later transfer to the Internet 320. Additionally, video switcher/splitter 308 routes the video signal to a video/audio monitoring path 322. This allows a human operator to know the progress of the video encoding operation.

Each of video encoder paths 310–316 operates in a similar manner. Each path receives left/right (L/R) audio from video switcher/splitter 308. The audio path (for video encoding path 310) is shown at 340. Video switcher/splitter 308 provides separate line-level audio signals for left and right, respectively, channels. The audio signals are passed to a graphic equalizer (eq) 342. Each left/right channel of the stereo audio signal is processed by the graphic eq is used to emphasize audio frequencies at about 1 kHz and to reduce the strength of the audio signals at about 20 Hz and 20 kHz. In the preferred embodiment, the equalizer is set to form a sinusoidal curve starting at −10 db at 20 Hz, reaching +4 db at 1 kHz and sloping back down to −10 db at 20 kHz. The purpose of the graphic eq is to modify the audio signal to take care of undesirable compression characteristics introduced at the time of encoding.

Next, the signal from graphic eq 342 is sent to audio compressor 344. Audio compressor 344 is a stereo audio compressor that compresses each audio signal if the audio signal exceeds 0 db. The compression ratio is 8:1. Note that, although specific values are provided for purposes of explaining the preferred embodiment, that various amounts, and types, of compression may be utilized similar to the variation possible with the graphic (eq), above. The intent of the audio compressor is to even out variations in the dynamic range of the audio. The left/right channel outputs of the stereo audio compressor are sent to streaming video encoder format #1 (350).

Returning to the video path of encoder path 310, the video signal is provided from video switcher/splitter 308 and is illustrated at 346. This is sent directly to a streaming video encoding computer. In the preferred embodiment, the streaming video encoder is a rackmount rack computer with two 500 MHz central processing units (CPUs), a video input/digitizing card and a stereo audio input/output card. The streaming video encoding computer includes streaming video compression software. The streaming video encoder has access to a large amount of nonvolatile storage such as a redundant array of inexpensive disks (RAID) on a local network.

The video input levels to the encoder are adjusted to increase saturation to the highest level possible without distorting the video image. Illumination level contrast and brightness are set to emphasize the appearance of the speaker and appearance of any computer images shown by the speaker. Audio levels are set to −10 db or −4 db depending on audio output component of video source.

In a preferred embodiment, the streaming video compression software is set to produce a file with video that plays at either 24,000 bits per second (24 kbps) or 95 kbps. The file resulting from the encoding process is stored, via the network, in the nonvolatile storage. The streaming video compression process is optimized to produce a result with a clearer image rather than an image with higher motion. In other words, a higher pixel density is favored over a higher frame rate.

As stated, the video encoding process can proceed in parallel for 4 different encoding paths 310–316 shown in FIG. 3. This provides for very fast encoding over multiple formats. Naturally, more or less encoding paths can be used.

Chapterizing

As the video is being encoded, it viewed in real-time by a human operator via monitoring path 322.

While viewing, the operator (i.e., the "compressionist") determines logical start and stop times of different topics in the video presentation. For example, start and stop times can be subjective, as where a speaker begins to talk about a new subject. In other cases, changing topics, or subject headings, can be more clearly defined as where the video includes a title separator between video segments, etc.

The compressionist determines a set of keywords which represent the content and context of each topic. Typically, the compressionist will have determined the start time for the topic and will make notes about keywords used in the subsequent discussion of the topic.

Each region of video where there is a coherent topic that starts and stops is called a chapter. The compressionist captures a frame of video representing the presentation of the chapter and reduces it to a thumbnail size. In the preferred embodiment, each thumbnail is approximately 80×60 pixels. Various off-the-shelf software can be used to perform a capture of a frame of video. The thumbnail can be captured from any format and at any size and is stored in any one of several popular image formats i.e. JPEG or GIF.

Selected keywords are entered into a video program database in association with each chapter. Each chapter is linked to the video presentation. For example, the chapter information can exist for a file of the same name as the video presentation encoded different formats. Each chapter has its own thumbnail image. The overall video presentation is associated with its own description and its own thumbnail image as well. The compressionist enters the location of the streaming video on the file server in association with the video presentation, or chapter, into a video program database. Thus, the results of a search on keywords produces a display that can utilize any of the text (i.e., keywords) or thumbnail images associated with chapters, or the video presentation, itself.

Load Balanced Video Distribution System

In the preferred embodiment, transfer of video information from Internet servers to end users, or viewers, is facilitated by distributing video files to multiple servers on the public Internet. Also, multiple video files can be distributed to multiple servers within company intranets. The preferred embodiment performs this distribution using off-the-shelf "mirroring software" specializing in large file distribution throughout noncontiguous IP networks. This software can be one of many different brands or internally written utilities.

When a user logs on to the primary company's web site, the Internet protocol address of the user system is determined using web server analysis tools. The route along the Internet from the server that the user is attempting to access to the user's computer is determined using standard Internet protocol tools such as "traceroute" and "ping." These tools provide a determination of the routes currently being used to transfer information to the user, and the time it takes for information to move to the user's computer.

The geographic location of the user's computer can be determined by having the user select a geographical zone. In a preferred embodiment, the user can indicate their geographic location by clicking on an image of a map that is displayed in the user's web browser.

Each video server has various characteristics recorded as an entry in a database. This entry records the video server's Internet Protocol address, geographic location, total serving capacity and current status. Additional records track the priority with which each server serves viewers in each geographical zone and the percentage of total video requests for each video that are to be met by each server. These records are used in conjunction with the network route analysis to determine the best server for each request. At the time a viewer requests a video, a list of servers is compiled in order of their nearness to the user in terms of the network topology. The list is then traversed from the server topologically nearest the user to the server topologically farthest from the server until a good match is found. In order for a server to be considered a good match it must have the following characteristics.

1) It is on-line and operating far enough below its total capacity that meeting this request would not overload it.
2) It is configured to serve this video.
3) It is configured to serve viewers in this geographical zone.
4) It is currently serving less than its' total load percentage for this video.
5) It is configured to serve this geographic zone with the highest priority.

In the event no server has all of these characteristics, the highest numbered characteristic is dropped and the comparison performed again until a server is found. In the event that multiple servers posses all the characteristics the topologically nearest server is selected as a by-product of the order in which the list is traversed.

When the server has been selected, another record is created in the database denoting that this server is serving an instance of this video to this user in this geographical zone. This record then becomes a factor in subsequent requests by affecting load percentages etc. The user then receives video from a server that is the best choice in terms of response time, network topology, and video server utilization.

All of a video server's characteristics can be changed at any time, even in the middle of a live broadcast, to manually direct all new users desiring the video source to a different server. This fine-grained configuration can be used to ensure that each viewer has an optimal experience and that effective utilization of all serving resources is reached.

The primary company also distributes video over the Public Internet "on-demand," as opposed to "live," permitting end-users to view the video at any time, by encoding and "chapterizing" the video, transferring the video files to multiple servers on the public Internet, and distributing the video to users who select the video "clips" from those servers using load balancing techniques.

Although the present invention has been discussed with respect to specific embodiments, these embodiments are merely illustrative, and not restrictive, of the invention. The scope of the invention is to be determined solely by the appended claims.

What is claimed is:

1. A method for encoding a video signal, the method comprising increasing the saturation level of the video signal to just below visual distortion of an image produced from the video signal;

increasing the contrast level of the video signal to emphasize the appearance of one of a speaker and a computer image shown in the image;

converting the video signal to digital data; and compressing the digital data.

2. The method of claim 1, further comprising the step of optimizing the video compression to produce a result with a clearer image rather than an image with higher motion.

3. The method of claim 1, wherein the encoded video signal is delivered in real time.

4. The method of claim 1, wherein the encoded video signal is delivered on demand.

5. The method of claim 1, wherein the encoding steps are performed at an encoding facility, wherein the encoding steps are performed after the video is received by satellite transmission at the encoding facility.

* * * * *